June 19, 1962 S. E. CHARM 3,039,938
DISPOSABLE BACTERIOLOGICAL KIT
Filed July 22, 1960
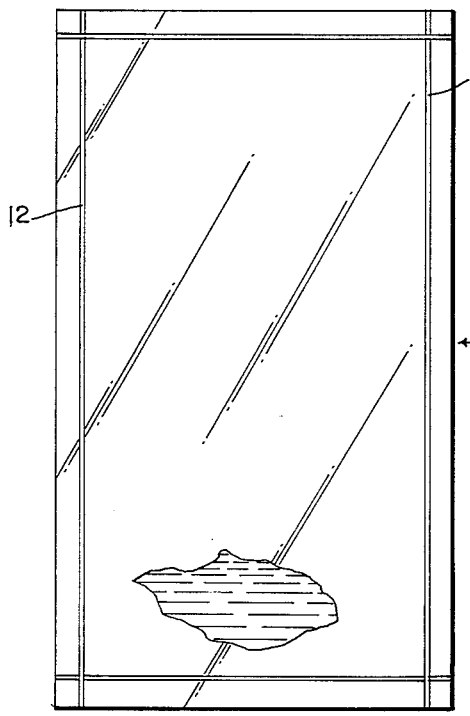
FIG. I
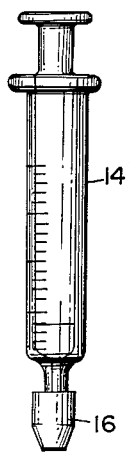
FIG. 2
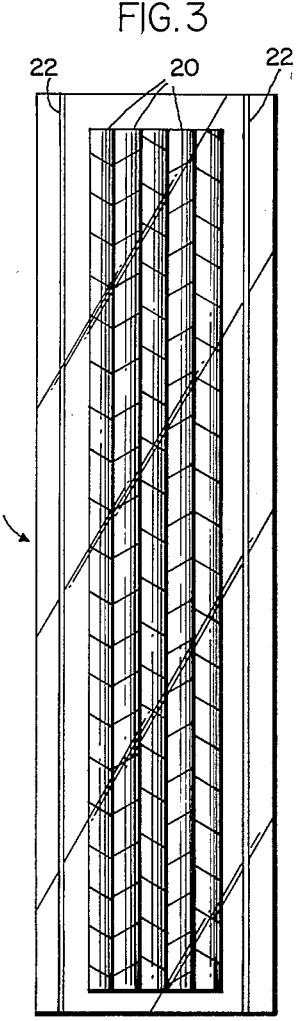
FIG. 3
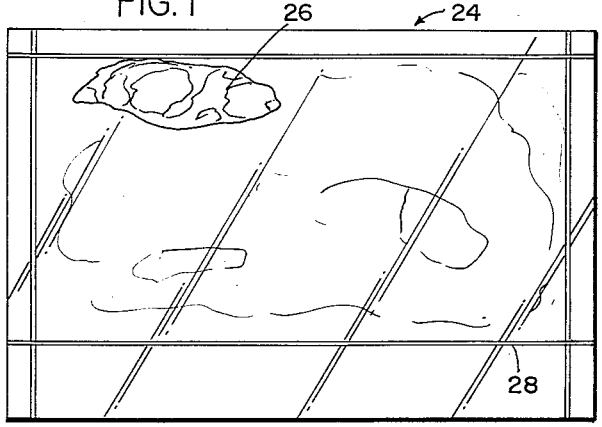
FIG. 4
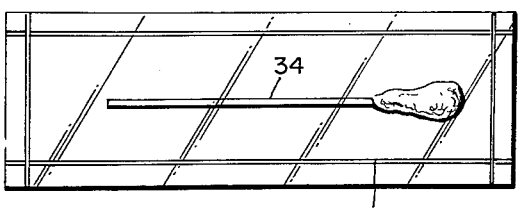
FIG. 5
INVENTOR.
STANLEY E. CHARM
BY *Kenway, Jenney,*
*Witter & Hildreth*
ATTORNEYS

United States Patent Office 3,039,938
Patented June 19, 1962

3,039,938
DISPOSABLE BACTERIOLOGICAL KIT
Stanley E. Charm, 47 Westchester Road, Newton, Mass.
Filed July 22, 1960, Ser. No. 44,688
10 Claims. (Cl. 195—139)

This invention relates to the measurement or observation of bacterial growth, and more particularly, to a novel and improved kit of disposable elements for use in providing bacteriological cultures which may later be qualitatively and quantitatively analyzed.

In the testing of samples of liquids or solids for the presence of bacteria, it is conventional to place a sample of the material being tested in a particular nutrient substance which will encourage the growth of colonies of bacteria which may then be quantitatively and qualitatively analyzed. The material to be tested may be diluted with distilled water such as by placing a measured amount of the test material into a sterilized bottle of sterile dilution water. The bacterial solution may then be removed by sterile means and mixed with a suitable nutrient substance contained in a test tube or Petri dish. This commonly used method for obtaining bacteria cultures requires the use of sterile equipment such is pipettes for removing and transporting liquid samples, sterilized containers for dilution water, and sterilized nutrient containers all of which must, of course, be cleaned and resterilized before they can be used again. The labor and expense involved in maintaining the implements in a sterile condition can be substantial in a laboratory where extensive testing is conducted. Further, the use of such equipment in this field is not particularly practical in view of the bulky nature of the implements used, and also the fact that such implements are normally easily breakable, and thus, are not suitable for rough handling often experienced in field testing.

Accordingly, it is the object of the present invention to provide a novel and improved kit for bacteriological testing with all of the elements in the kit, which of necessity must be sterile, being disposable, thus eliminating the resterilization and cleaning of these items.

It is the further object of this invention to provide such a bacteriological kit, the disposable items of which are economical, are of a configuration whereby they are easily used and effectively eliminate any contact of the materials being tested by the technician, so as to prevent any contamination of the test material or technician, are suitable for use in an operation wherein the test material is mixed with the nutrient substance or where the nutrient substance is streaked with the test material, are suitable for use with a solid or liquid test material, and which will provide for accurate qualitative and quantitative detection either in a laboratory or in the field under rough handling and adverse environmental conditions.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

The primary elements of the disposable bacteriological kit of this invention are shown in the accompanying drawing in which:

FIG. 1 is a plan view of a disposable pouch containing dilution water;

FIG. 2 is a plan view of a syringe of a type usable with the kit;

FIG. 3 is a plan view of a pouch of sterilized disposable pipettes;

FIG. 4 is a plan view of a disposable pouch containing a nutrient substance; and FIG. 5 is a plan view of a pouch containing a swab.

The disposable bacteriological kit of the present invention comprises, as its basic elements, a pouch of dilution water such as shown generally at 10 in FIG. 1 and a pouch containing a nutrient substance such as agar as shown generally at 24 in FIG. 4. The pouch for the dilution water is preferably fabricated from a heat sealable, transparent, microorganism impermeable plastic material such as a heavy density polyethylene or polypropylene. The pouch should be pliable, and the material of the pouch should have the characteristic of forming a liquid seal when it is folded back upon itself in a manner later described. Further, the material of the pouch should be capable of withstanding, without determination, heat sterilization by conventional methods at temperatures above 212° F. and sufficient to destroy spores in the water. The pouch 10 contains a predetermined quantity of distilled water and is heat sealed as at 12 to form a fluid tight container. I prefer to place either 90 ml. or 99 ml. of distilled water in the pouch 10 so that by the addition of 10 cc. or 1 cc., respectively, of a sample substance a percentage dilution of 10% or 1%, respectively, may be obtained. After the distilled water has been placed in the pouch and the pouch heat sealed, the pouch is heat sterilized by conventional methods so as to sterilize the water within the pouch. The pouch 10 is preferably only partially filled with water so that it is relatively flat, thus facilitating storage.

In order to prepare a sample solution, a measured amount of the test sample, either liquid or solid, is placed in the distilled sterile water of the pouch 10, for example, by cutting off the top of the pouch. Where the sample is a liquid, a measured amount thereof may be obtained by the use of a conventional syringe 14 such as shown in FIG. 2. The syringe is provided with the usual graduations and is provided with a rubber tip 16. In order to avoid contamination of the syringe by the test sample, a transparent pouch 18 of sterilized pipette 20, as shown in FIG. 3, may be provided with the kit. The pipettes may be of any suitable economical structure, for example, in a preferred specific embodiment of the invention, I have used conventional waxed paper straws, commonly referred to as soda straws. The pipettes should, however, have a capacity which is sufficient to handle the normal maximum sample which will be handled, with the particular size syringe used inasmuch as it is not desired to have any of the sample enter the interior of the syringe. The pouch 18 is preferably fabricated from a heat sealable, transparent, microorganism impermeable plastic material which is capable of withstanding conventional heat sterilizing techniques at temperatures above 212° F. and sufficient to destroy spores. In the specific embodiment of FIG. 3, the pouch 18 comprises a section of a tube of polyethylene which is heat sealed as at 22. The straws are preferably arranged side by side in a single layer to provide a relatively flat package. After the pipettes have been placed within the pouch, the pouch is then heat sterilized to obtain sterilization of the pipettes. When it is desired to use one of the pipettes in the pouch 18, the pouch is merely cut open, the pipette removed, and the rubber tip 16 of the syringe is inserted into one end of the pipette with a twisting motion. The other end of the pipette may then be inserted into the liquid to be tested and the plunger of the syringe drawn outwardly by an amount corresponding to the desired quantity of the sample as indicated by the graduations on the syringe. The pipette is then inserted into the dilution water pouch 10 and the liquid expelled from the pipette. The opened corner or end of the pouch 10 is then rolled up upon itself, preferably at least twice, to form a liquid seal. The rolled down portion of the pouch 10 may be held in place with pressure sensitive tape or by clips such as conventional paper clips. The pouch is then gently shaken or kneaded to thoroughly mix the test liquid and the dilution water. If the material to be tested is a solid or semi-solid, a measured amount thereof may merely be inserted into the dilution pouch 10 and the test material worked inside the pliable pouch by gently kneading the material so as to assure a satisfactory mixture.

After the test solution has been prepared in the dilution pouch, a measured amount of the solution is withdrawn and mixed with the nutrient substance in the pouch 24 as shown in FIG. 4. In removing the test solution from the dilution pouch 10 the syringe 14 and one of the pipettes 20 are utilized in the manner heretofore described in connection with obtaining an accurate measured amount of the test liquid. As previously described, the graduations on the syringe are used to indicate the amount of solution drawn into the pipette, and care should be taken that the solution does not enter the syringe where it can contaminate the syringe. Accordingly, it is apparent that the syringe need not be cleansed and sterilized before the next use thereof, thereby eliminating a bothersome and time-consuming task particularly where a substantial number of tests are to be run.

The pouch 24 containing the nutrient substance is relatively flat and is fabricated from a pair of overlying layers of heat sealable, pliable, plastic material which is microorganism impermeable and transparent and which is capable of being subjected to heat sterilization by conventional techniques at temperatures above 212° F. and sufficient to destroy any spores in the nutrient substance. Further, the material from which the pouch is fabricated should not have any adverse effect on culture development and should provide a tight seal when folded over upon itself, as hereinafter described. The pouch contains a quantity of a nutrient substance which is hermetically sealed within the pouch by heat sealing the pouch adjacent the marginal edges thereof as at 28. It is often desirable to mark the pouches to indicate the type of culture, and in this connection a tab 30 is provided on the pouch. At least the surface of the tab 30 of the pouch is preferably treated by known methods to render the surface of the material suitable for ink marking by a ballpoint pen or the like. The nutrient substance in the pouch 24 can be of any suitable type, however, it is preferred to use either a nutrient broth or an agar usually used in culturing which will be solid or semi-solid at room temperature. The use of agar has the advantage that when the agar is in a solid state it may be used in operations and often it has been heated to place it in a liquid state and it is suitable for use in the mixing with liquids.

In using the nutrient pouch 24 with test liquid, the pouch is initially placed in boiling water for a sufficient time to melt the agar whereupon the pouch is then placed in a water bath held at approximately 45° C. for a time sufficient to cool the agar to the bath temperature. The pouch may be left in the bath until it is ready for use. The agar pouch is then cut open on one end thereof, and the test solution is inserted into the agar pouch with the pouch being held in a vertical position. The sides of the open end of the agar pouch are then spread apart, and the open end of the pouch is rolled or folded over upon itself a sufficient number of times to provide an air tight seal and at the same time trapping a quantity of air in the pouch. The rolled end of the pouch may be held by paper clips or the like, or if desired, pressure sensitive tape may be utilized. The test solution and nutrient substance is then thoroughly mixed by gently moving the pouch. The nutrient pouch is then placed in a horizontal position on a supporting surface with the pouch placed with the roll at the open end of the pouch being on the upper side of the pouch. The pouch is then gently flattened with the hand, or some suitable object, in order to spread the nutrient substance evenly and in a thin film over the bottom side of the pouch, and at the same time, forcing the air in the pouch to form a pocket above the agar. The agar is then allowed to harden. After hardening, the nutrient pouch is turned over so that the roll at the cut end of the pouch is on the bottom as will also be the air pocket in the pouch. The agar which had been spread over what is now topside of the pouch is therefore in a position where condensate is prevented from falling on the agar. The pouch is then incubated in a conventional manner, and the colonies of bacteria may be counted or observed through the transparent pouch in the usual manner and from either side of the pouch.

If it is desired to isolate the colonies through streaking, the agar in the pouch 24 may be melted in the manner previously described. One end of the pouch is then rolled down and held in place with a paper clip or the like but without having previously cut the end of the bag. The sterile air in the bag will thus form an air pocket when the end of the pouch is rolled down. The pouch is then placed in a horizontal position with the rolled portion of the pouch on the top side, and the agar is allowed to harden in a thin film on the bottom side of the pouch. After the agar is hardened, the rolled end is unrolled and cut open. The bag is preferably held open by gripping the exterior of the top side of the pouch on which the agar has not hardened and holding the same away from the bottom side. The agar may then be streaked with test material by means of an inoculating needle, and the opened end may then be again rolled down trapping air in the pouch, as described before, and the rolled end clipped in place. The pouch may then be incubated in the usual manner. When it is desired to remove colonies from the incubated plate, the pouch may be cut open by slitting along opposite edges thereof and laying back the top side of the pouch making the colonies accessible to an inoculating needle.

Where it is desired to make a swab test, there is provided, as shown in FIG. 5, a relatively flat pouch 32 of heat sealable transparent microorganism impermeable plastic material and containing a swab 34 which is sealed within the pouch 32 by the heat seals such as at 36. The pouch also contains distilled water. After the water and swab have been sealed within the pouch, the pouch is sterilized by a conventional heat sterilization technique at temperatures above 212° F. and sufficient to destroy spores. When it is desired to use the swab, one end of the pouch 32 need merely be cut open and the swab removed. The swab is then employed in the usual manner after which it is returned to its pouch 32 for immersion in the sterile distilled water therein. A sample of the water in the pouch 32 is then placed in the dilution water pouch 10 in the manner described above in connection with the testing of liquids.

The disposable kit of the present invention has, as previously described, as its basic elements, the dilution pouch 10 and nutrient pouch 24. However, the kit also may comprise the pipette pouch 18. Optionally, the swab pouch 32, as well as a supply of paper clips or pressure sensitive tape, or both, may be supplied with the kit. All of these items are, of course, disposable. The remaining accessory equipment such as the syringe 14 and equipment such as incubators, magnifying glasses and tally counters for use in the analysis are not disposable and thus do not form a part of the kit. However, if desired, the syringe 14 may be of a plastic disposable type. Each kit comprises a plurality of the disposable items therein sufficient in number for extensive testing in the field.

As will be apparent from the foregoing, none of the portions of the items in the kit which are contaminated by contact with the bacteria being tested are required to be contacted by the technician using the kit, thus, avoiding contamination of the test material, and at the same time, protecting the operator from direct contact with the bacteria. The dilution pouch and nutrient pouch, being transparent, facilitate determination of complete mixing of the test materials in the dilution pouch and also make it possible for direct observation of the bacteria colonies through the nutrient pouch on either side thereof. The dilution pouch and nutrient pouch, as well as the pipette and swab pouches, being preferably substantially flat after their contents have been sealed therein, facilitate storage of the elements. The various pouches are easily sterilized once their contents are sealed therein, and the pouches will maintain the contents sterile until the use thereof. While the various pouches and their contents are disposable, the cost thereof is consistent with the expendable nature of the elements. The various pouches are sufficiently rugged to withstand rough handling during field use, and obviously, the disposable items are not breakable in the sense of the usual test tubes, beakers, etc.; also, the pouches will maintain their contents in sterile condition even though exposed to adverse environmental conditions. Thus, it will be apparent that while the disposable bacteriological kit of this invention is of considerable value as a time and expense saving convenience in the laboratory, it is of particular advantage when used in conjunction with field testing.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim:

1. A disposable bacteriological kit comprising, a plurality of thin heat-sealed disposable dilution pouches each fabricated of transparent pliable microorganism impermeable plastic material and each containing a quantity of distilled water which has been heat sterilized to destroy spores after having been sealed in the dilution pouch, the dilution pouch being only partially filled with the distilled water so as to be relatively flat, and a plurality of heat-sealed disposable nutrient pouches each fabricated of transparent microorganism impermeable plastic material which will not adversely affect the culture development, each of the nutrient pouches being partially filled with a quantity of a nutrient substance which is normally at least semi-solid and which becomes liquid when heated, the nutrient pouches each being only partially filled with a nutrient substance so as to be relatively flat.

2. A disposable bacteriological kit comprising, a plurality of relatively flat heat-sealed disposable dilution pouches each fabricated of transparent pliable microorganism impermeable plastic material capable of being heat sterilized by conventional techniques, each of the dilution pouches being only partially filled with a quantity of distilled water which has been heat sterilized to destroy spores after having been sealed in the pouch, and a plurality of heat-sealed disposable nutrient pouches each being partially filled with a quantity of an agar, each of said nutrient pouches being fabricated from a transparent microorganism impermeable plastic material which will not adversely affect culture development and which may be heated at least 212° F. without deterioration.

3. A disposable bacteriological kit comprising, a plurality of relatively flat disposable dilution pouches each fabricated of a transparent pliable microorganism impermeable plastic material and each containing a quantity of sterilized distilled water sealed therein, the material from which said dilution pouch is made having the characteristic of providing a liquid seal when folded back upon itself so that the pouches may be opened by cutting off a portion thereof to permit the introduction of test material and then may be resealed by folding back upon itself, and a plurality of nutrient pouches each containing a quantity of a nutrient substance sealed therein, the material from which each of said nutrient pouches is fabricated being microorganism impermeable pliable and transparent and having the characteristic of forming an air seal when folded back upon itself so that the nutrient pouch may be opened and a test substance placed in contact with the nutrient substance and the pouch again sealed by folding back upon itself, each of said nutrient pouches being only partially filled with the nutrient substance so that an air pocket may be formed in the nutrient pouch after it has been opened and when it is folded to reseal the pouch.

4. A disposable bacteriological kit comprising, a plurality of relatively flat disposable dilution pouches each fabricated of a transparent pliable microorganism impermeable plastic material each containing a quantity of sterilized distilled water sealed therein, each of the dilution pouches being only partially filled with distilled water, a plurality of disposable pouches each containing a plurality of pipettes which have been heat sterilized to destroy spores after having been sealed within the pouch, the pipettes being fabricated from a normally unbreakable material, and a plurality of relatively flat disposable nutrient pouches each containing a quantity of a nutrient substance which is normally at least semi-solid and which becomes liquid when heated, the nutrient pouch being fabricated of a pliable transparent microorganism impermeable plastic material which will not adversely affect culture development and which may be heated without deterioration, each of the nutrient pouches being only partially filled with the nutrient substance.

5. A disposable bacteriological kit comprising, a plurality of relatively flat dilution pouches in each of which is sealed and contained a quantity of distilled water heat sterilized after having been placed in the dilution pouch, each of the dilution pouches being fabricated of transparent pliable microorganism impermeable plastic material having the characteristic of providing a liquid seal when it is folded back upon itself so that each of the pouches after being opened may be resealed by folding, a plurality of disposable pipette pouches each having a plurality of conventional paper straws sealed and heat sterilized therein, the material from which the pouches containing the straws is made being microorganism impermeable and capable of being heat sterilizable without deterioration to destroy spores, and a plurality of nutrient pouches each having a quantity of agar contained and sealed therein and each being fabricated from a transparent pliable microorganism impermeable plastic material which will not affect culture development and which may be heated to at least 212° F. without deterioration, each of the nutrient pouches being only partially filled with agar.

6. A disposable bacteriological kit comprising, a plurality of relatively flat dilution pouches in each of which is sealed and contained a quantity of distilled water heat sterilized after having been placed in the dilution pouch, each of the dilution pouches being fabricated of transparent pliable microorganism impermeable plastic material having the characteristic of providing a liquid seal when it is folded back upon itself so that each of the pouches after being opened may be resealed by folding, a plurality of disposable pipette pouches each having a plurality of disposable pipettes sealed and heat sterilized therein, the material from which the pouches containing the pipettes is made being heat sterilizable to destroy spores by conventional techniques without deterioration, arranged side by side in a single layer, a plurality of relatively flat disposable nutrient pouches each containing a quantity of a nutrient substance which is normally at least semi-solid and which becomes liquid when heated, the nutrient pouch being fabricated of a pliable transparent microorganism impermeable plastic material which will not adversely affect culture development and which may be heated without deterioration to destroy spores, each of the nutrient pouches being only partially filled with the nutrient substance, and a plurality of relatively flat pouches each having swab and a quantity of sterile distilled water disposed and sealed therein and each being fabricated from a transparent plastic material capable of being heat sterilized without deterioration by conventional techniques to destroy spores.

7. A disposable bacteriological kit comprising, a plurality of relatively flat heat sealed dilution pouches each fabricated of a transparent pliable plastic microorganism impermeable material having the characteristic of forming a liquid seal when it is folded back upon itself, each of said solution pouches having a quantity of distilled water sealed therein and only partially filling the pouch, the distilled water having been heat sterilized after placed in the solution pouch, and a plurality of disposable pouches each having contained and sealed therein a plurality of conventional paper straws which have been sterilized after being sealed in the pouch, each of the pouches containing the straws being fabricated of a transparent plastic microorganism impermeable material which may be heat sterilized without deterioration to destroy spores, the straws in each pouch containing the same being arranged side by side in a single layer so that the pouch is relatively flat, a plurality of relatively flat heat-sealed disposable nutrient pouches each fabricated of a transparent microorganism impermeable plastic material which will not adversely affect the culture development and which may be heated without deterioration to at least 212° F., each of the nutrient pouches having a quantity of agar sealed therein and only partially filling the pouch, the material from which the nutrient pouches are made further having the characteristic of providing an air seal when the material is folded back upon itself so that the pouches may be opened and a test substance contacted with the agar and the pouch subsequently resealed by folding.

8. A disposable nutrient pouch for bacteria culture operations comprising, a pair of overlying layers of a transparent pliable microorganism impermeable plastic material heat-sealed adjacent their marginal edges to provide a sealed space within the pouch, a quantity of a nutrient substance disposed and sealed within and only partially filling said space so that the pouch is relatively flat, the nutrient substance having been heat sterilized to destroy spores after having been sealed within the pouch, the material from which the pouch is fabricated being capable of being heated without deterioration to temperatures above 212° F. sufficient to destroy any spores with the pouch and having the characteristic of not adversely affecting culture development.

9. A disposable nutrient pouch comprising, a pair of overlying layers of relatively thin transparent microorganism impermeable plastic material heat-sealed adjacent their marginal edges to provide a sealed space within the pouch, said space being only partially filled with a quantity of agar so that said pouch is relatively flat, the material from which the pouch is fabricated having the characteristic of providing an air seal when it is folded back upon itself, the pouch being sufficiently unfilled so that after it is opened and the test substance contacted with the agar the pouch may be resealed by folding thereof back on itself, the pouch material further being capable of being heated to a temperature of at least 212° F. without deterioration.

10. A disposable nutrient pouch for bacteriological culture operations fabricated from a pair of layers of thin polypropylene and the like heat sealed to provide a sealed space in the pouch, said space being only partially filled with a quantity of agar so that said pouch is relatively flat and so that said pouch may be opened and a quantity of test material contacted with the agar and the pouch resealed by folding while at the same time trapping an air pocket in the pouch, said pouch having at least a portion of an outer surface thereof which has been rendered suitable for ink marking.

References Cited in the file of this patent
UNITED STATES PATENTS

| | | |
|---|---|---|
| 2,874,091 | Fisk | Feb. 17, 1959 |
| 2,904,474 | Forg | Sept. 15, 1959 |
| 2,954,327 | Kanz | Sept. 27, 1960 |